United States Patent [19]

Hatfield

[11] 4,141,320

[45] Feb. 27, 1979

[54] PORTABLE EGG TRANSPORTING UNIT

[76] Inventor: Hubert P. Hatfield, 218 W. Riverview Rd., Baltimore, Md. 21225

[21] Appl. No.: 728,463

[22] Filed: Sep. 29, 1976

[51] Int. Cl.² ................ A21B 1/22; F27D 11/02
[52] U.S. Cl. ................................. 119/37; 119/39; 219/400
[58] Field of Search ............ 219/385, 386, 400, 401; 35/119; 126/21 A; 312/114, 236; 128/256; 236/44 R, 44 E; 68/5 R; 237/14, 15

[56] References Cited

U.S. PATENT DOCUMENTS

| | | | |
|---|---|---|---|
| 1,884,843 | 10/1932 | Petersime | 119/37 |
| 1,893,694 | 1/1933 | Bohmker | 119/37 |
| 1,943,575 | 1/1934 | Abendroth | 119/37 |
| 2,201,389 | 5/1940 | DeGive | 236/44 |
| 2,364,722 | 12/1944 | Kazantzeff | 119/37 |
| 2,633,846 | 4/1953 | Wray | 219/527 X |
| 2,688,808 | 9/1954 | Ipsen | 219/400 X |
| 2,791,199 | 5/1957 | Hamnett | 119/35 |
| 3,404,873 | 10/1968 | Orens | 261/DIG. 34 |
| 3,482,078 | 12/1969 | Milne | 219/387 |
| 3,545,832 | 12/1970 | Levenback | 312/114 |
| 3,855,451 | 12/1974 | Lee | 219/400 |

FOREIGN PATENT DOCUMENTS 569433 2/1933 Fed. Rep. of Germany ............ 119/37

Primary Examiner—J. V. Truhe
Assistant Examiner—Bernard Roskoki
Attorney, Agent, or Firm—J. Wesley Everett

[57] ABSTRACT

This apparatus is particularly adapted for transporting eggs and at the same time keeping the eggs incubated while they are being transported. The apparatus has a cabinet which has a thermostatically controlled heating unit, a moisture laden pad, a fan for circulating the air within the cabinet, a motor operatable on either a regular automobile 12 volt battery current or regular 120 volt house current for operating the heating unit and the fan. Within the cabinet is a tray having openings therethrough through which the moisture laden air may move about one or more egg carrying containers positioned on the tray.

1 Claim, 8 Drawing Figures

PORTABLE EGG TRANSPORTING UNIT

The present invention relates to an apparatus for transporting eggs and at the same time keeping the eggs incubated during the transporting period, such as, moving eggs from one incubator to another, or from a nest or other location where incubation has begun by natural means.

One object of the invention is to provide a relatively small portable egg transporting apparatus having a cabinet which is equipped with means for continuing the incubation of the eggs while they are being transported.

Another object of the invention is to provide means for operating the apparatus on the electric current generally available in a motor vehicle (12 volts), or on the electric current generally supplied by the utility companies (120 volt).

Another object of the invention is to provide separate containers carrying a limited number of eggs for separation of the eggs and for easy handling.

While several objects of the invention have been set forth, other means, uses and advantages will become apparent as the nature of the invention is more fully disclosed from the following detailed description with reference to the accompanying drawings.

In referring to the drawings like and similar reference characters are used to designate like and similar parts throughout the several views.

Figure 1:
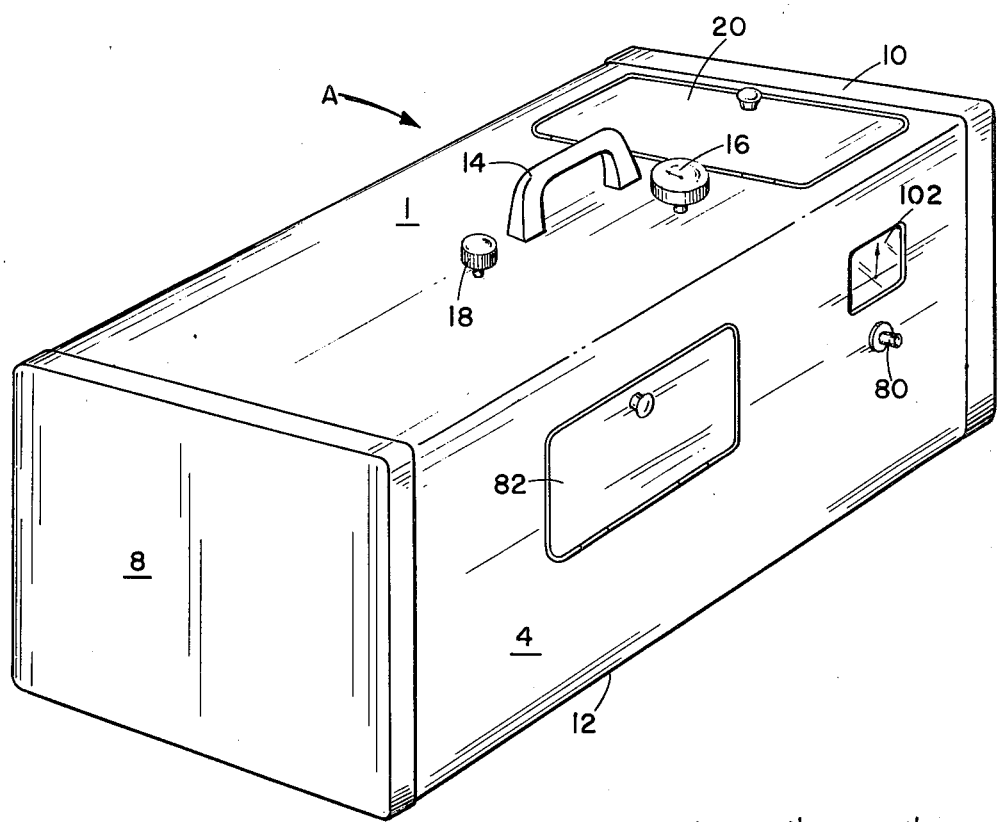
FIG. 1 is a view in perspective of the cabinet as it would appear ready for use.

The apparatus is in general designated by the letter A and comprises a cabinet including a top panel 1, side panels 4 and 6, and end members 8 and 10, and a bottom panel 12.

Positioned on the top panel 1 is a carrying handle 14, a temperature gauge 16, a temperature control knob 18 and a lid 20 for covering a space 22 which is normally used to store the lead wires 24 and 26 for electrically connecting the apparatus to either the vehicle battery or to a utility source.

Referring to FIGS. 5 to 8, the cabinet is provided with a heating unit 30 spaced upwardly from the bottom 12 of the cabinet. Supported above the heating unit is a pan-like member 32 supporting a water saturated sponge-like member 34 and above the member 34 is an air flow-through tray 38, such as a screen, or a perforated panel, for receiving the eggs to be transported, which are preferably placed in trays 40.

Positioned preferably at one end of the cabinet is a fan (not shown) housed within a housing 44 operated by an electric motor 46.

The fan housing 44 is provided with an air conduit 51 extending downwardly toward the bottom of the cabinet having an elbow 51' to angle the air along the bottom of the cabinet and over the heating coils 30. At the end of the pan-like member 32 there is a suitable screen-like member 52 for preventing the eggs, or young chicks, from falling over the end of the tray 38 into the area of the heating element.

Extending inwardly from the top of the cabinet and connected with the knob 18 is a temperature control element or thermostat 62 which is connected with an electrically operated switch 64 which may be set for predetermined temperatures at which the interior of the cabinet is to be kept.

Figure 5:
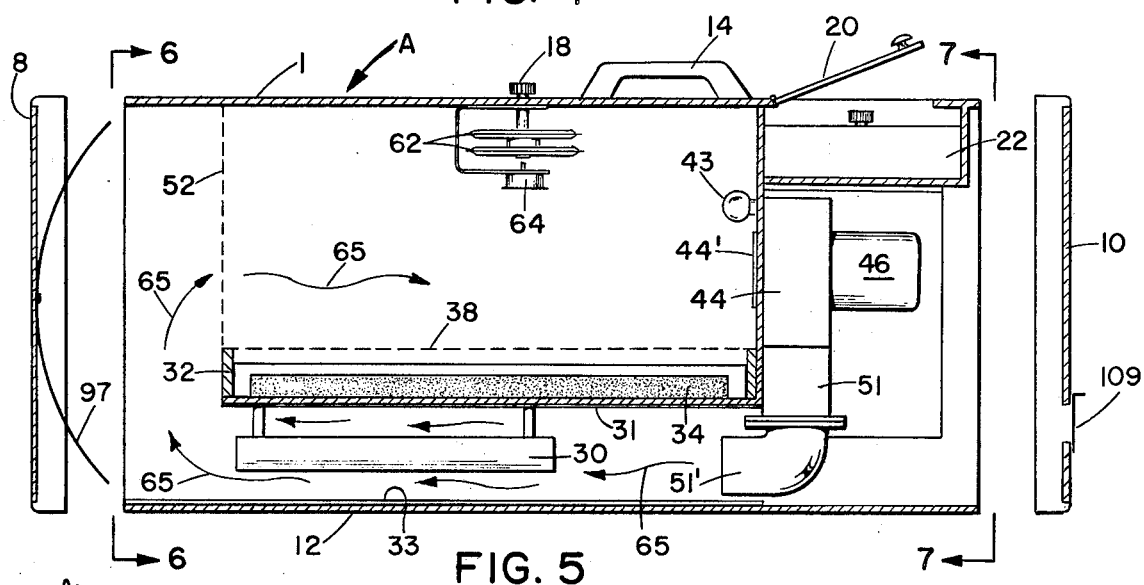
FIG. 5 is a sectional view taken on line 5—5 of FIG. 4.
Figure 6:
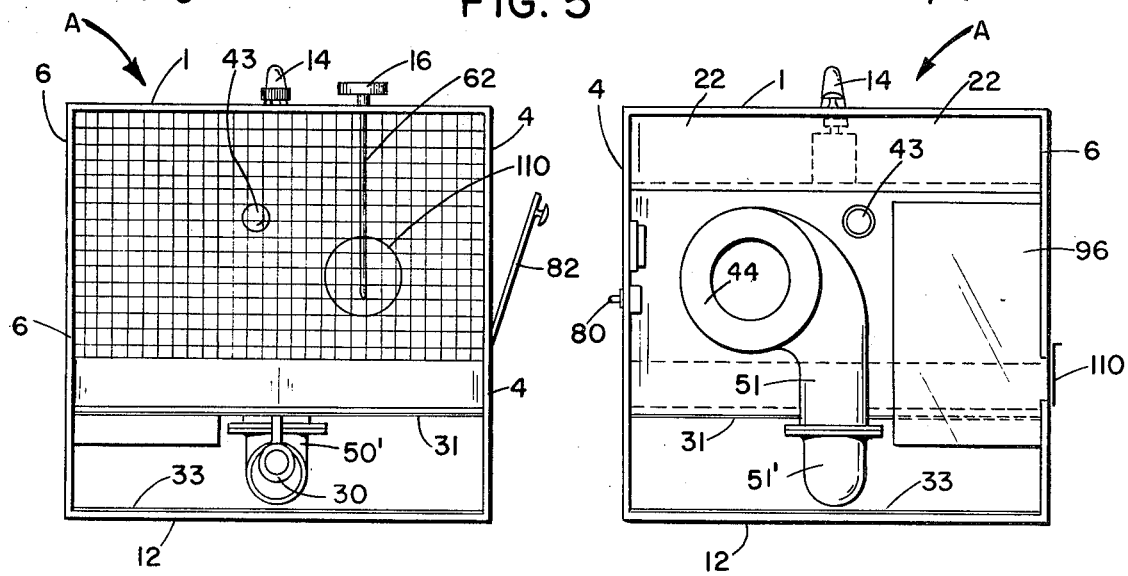
FIG. 6 is an end view taken on line 6—6 of FIG. 5.
Figure 7:
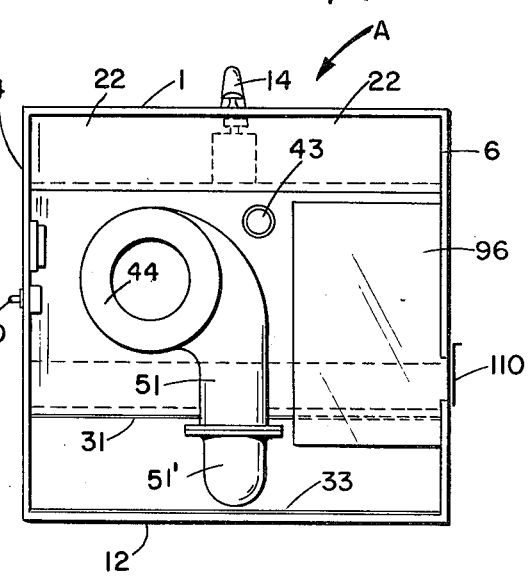
FIG. 7 is an end view taken on line 7—7 of FIG. 5.
Figure 8:
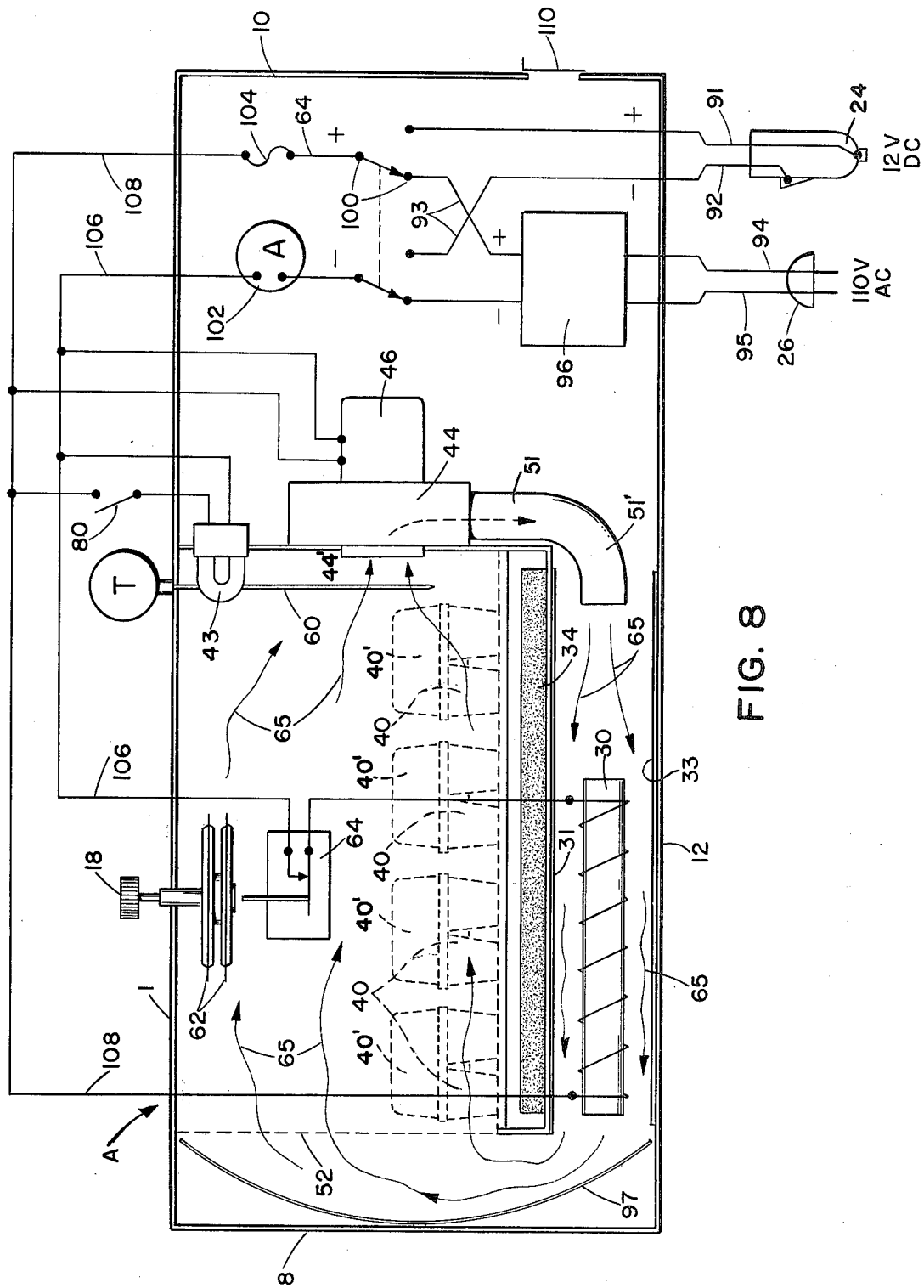
FIG. 8 is a schematic electric wiring diagram as used in the apparatus.

The path of the circulated air is shown by the arrows 65 in FIGS. 5 and 8 wherein the air is directed along the bottom of the cabinet by the conduit 51 where it is electrically heated by the heating unit 30 and elevated by the deflector 97 over the egg trays back to the fan where it is recirculated through the cabinet.

Figure 3:
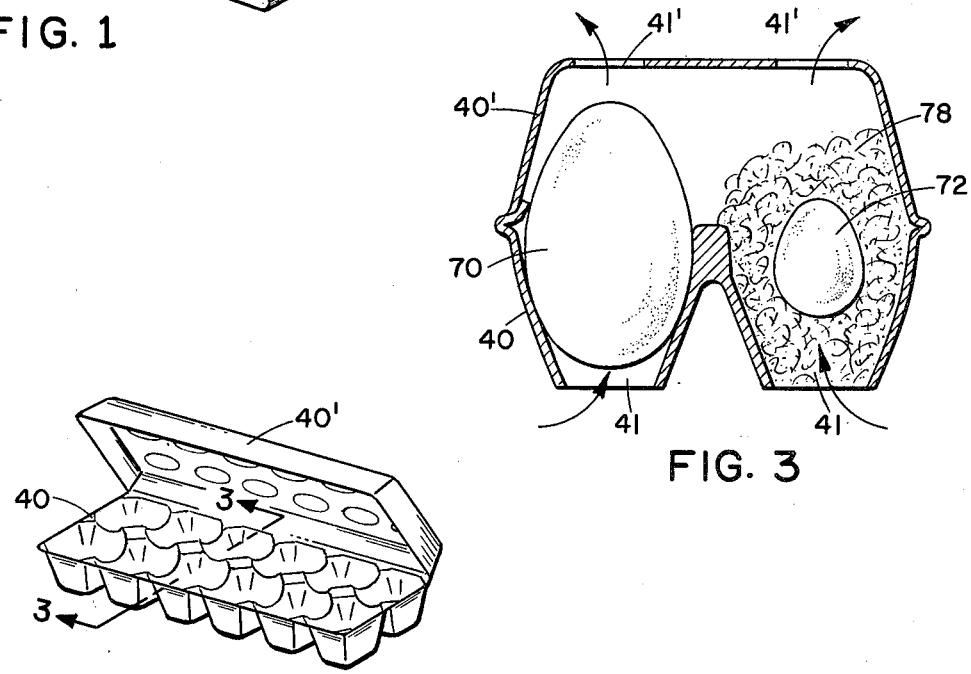
FIG. 3 is an enlarged sectional view taken on line 3—3 of FIG. 2.
Figure 2:
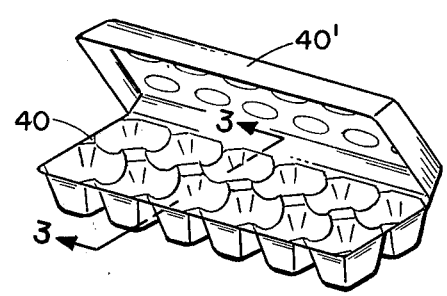
FIG. 2 is a perspective view of one of the egg holding containers.
Figure 4:
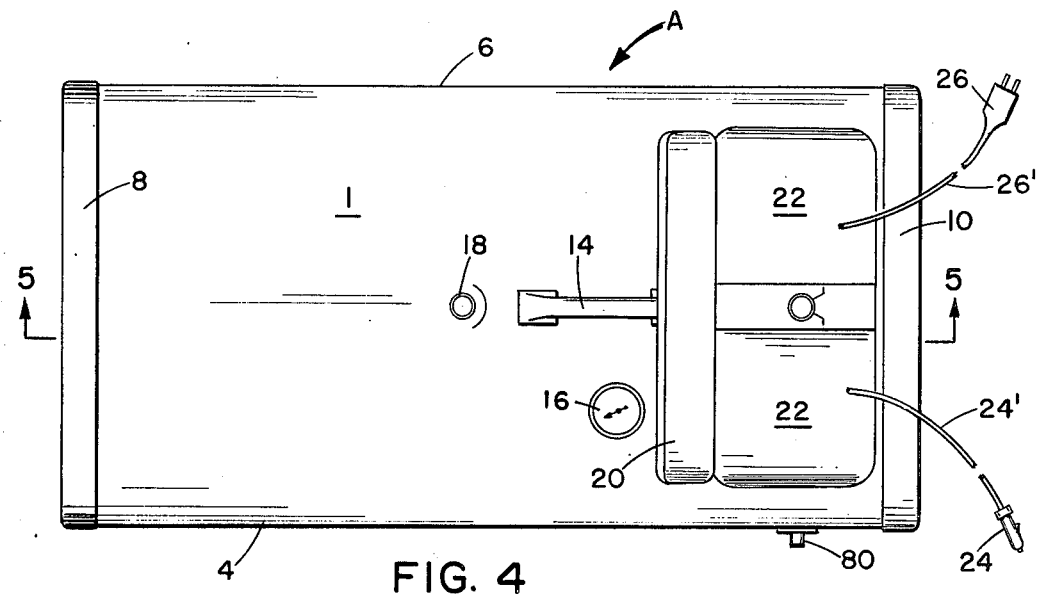
FIG. 4 is a top plan view of the cabinet.

The small containers for carrying the eggs are shown in FIGS. 2, 3 and 8. While these trays are shown having a top 40' such tops may be dispensed with if desired. However, these small egg-retainers may be dispensed with and any suitable means may be used for retaining the eggs on the tray.

FIG. 3 shows how the average size chicken egg 70 will rest in the container 40. Also, there is shown how a smaller egg 72 may be carried in the same size container by providing a loose type material 78 such as cotton or similar material wrapped about the smaller egg in which air can freely circulate through the material and about the egg.

The containers 40 are provided with a bottom opening 41 to permit for the passage of air into the container and about the eggs. If the containers are provided with a top or cover 40', there is also provided an opening 41' in the cover.

Positioned within the cabinet is a light 43 operatable by the switch 80 for lighting the interior of the cabinet. There is also provided a door 82 in at least one side of the cabinet opposite the egg trays for inserting or removing the egg container.

Referring in particular to FIG. 8, the fan motor 46 and heating unit 30 may be operated on either a 12 volt battery current, or a 120 utility circuit as previously stated. If the apparatus is being transported in a vehicle, the current supplied will be 12 volt from the vehicle electric system. For connecting the apparatus with the vehicle electric system, the plug 24 is adapted to be plugged into the cigarette lighter socket of the vehicle (not shown). Electric current will travel through the plug 24, wires 91 and 92 extending through the cable 24', to a multiple pole switch 100. The electric current then passes through the ammeter 102 and the fuse 104 to the lead wires 106 and 108 to the heating unit 30 and the fan motor 46. It will be noted that the lead 106 to the heating unit passes through the temperature control switch 64.

When it is desirable or necessary to use a 110 volt circuit of a utility system (which is normally alternating current), the connector plug 26' is inserted into a conventional socket (not shown) and the electric current will travel through the wires 94 and 95 of the cable 26 to a rectifier and/or transformer 96 through a multiple pole switch 100, as shown in full lines in FIG. 8, to the leads 106 and 108 to reduce the voltage to 12 volts and to the type of electric current to operate the heating unit and fan motor as previously described.

In operation, the warm moist air is circulated through the cabinet by the fan as indicated by the arrows 65, traveling along the bottom of the cabinet from the end 51' of the conduit 51 between the heat resisting covering 31 on the bottom of the pan-like member 32 and the heat resisting covering 33 normally positioned along the bottom 12 of the cabinet. The air is heated by the heating unit 30 as it passes along the bottom of the cabinet to the opposite end thereof where it is deflected upwardly by the deflector plate 97 and in the reverse direction over the top of the eggs to the fan inlet 44' in the hood 44 wherein the circulation of the air is repeated as previously described. The cabinet is provided with one or more preferably manually adjustable vents such as that shown at 109 in FIG. 5 for supplying fresh air to the cabinet if it is needed, and as shown at 110 for admitting air primarily for cooling the rectifier and/or transformer 96. An egg transporter of this type is extremely beneficial particularly for rangers and naturalists who collect egg specimens.

While a specific form of the invention has been shown and described, it is not intended as a limitation as the scope of the invention is best defined in the appended claims.

I claim:

1. A portable egg incubator and transporting unit comprising a horizontal rectangular cabinet having a vertical wall positioned at one end of the cabinet to form a relatively small separate compartment within the cabinet, a single air channel extending along and adjacent the bottom of the cabinet from the said vertical wall to the opposite end of the cabinet, a moisture supply pan positioned adjacent the bottom of the cabinet and above the air channel, the moisture supply pan extending from the vertical compartment wall to a line positioned inwardly from the opposite end of the cabinet to provide an opening between the opposite end of the moisture supply pan and the opposite end of the cabinet for allowing air to pass from the channel adjacent the bottom of the cabinet to the upper portion of the cabinet, a moisture retaining pad of sponge-like material and of such size as to fit within said moisture supply pan, an air-flow-through egg supporting tray positioned above and in a plane parallel with the moisture supply pan, a hood for housing a fan member positioned within the said separate compartment and secured to the vertical wall having an opening in the said wall opposite the said hood for allowing air to enter the hood to be circulated by said fan, said hood having an air duct connected adjacent the lower side leading to the lower air channel adjacent the bottom of the cabinet, the lower end of the said air duct being angled substantially parallel to a plane parallel with the bottom of the moisture supply pan allowing for circulation of the air from the hooded fan through the bottom air channel to the upper portion of the cabinet and over the egg-supporting tray and into the opening in the said vertical wall to the hood to be recirculated, at least one heating unit positioned within the air channel adjacent the bottom of the cabinet and spaced upwardly from the bottom of the cabinet for heating air passing therethrough, a thermometer within said cabinet and positioned adjacent the opening in the hood having means extending through the top of the cabinet for reading the temperature within the cabinet and an electrically controlled thermostat positioned within the cabinet and in the area of the air stream passing over the egg-supporting tray having means extending through the top of the cabinet for adjusting the said thermostat and a handle means secured to the top surface of the cabinet for carrying said portable egg incubator and transporting unit, a closable opening in the cabinet opposite the egg tray for inserting and removing said eggs.

* * * * *